(12) United States Patent
Gaw

(10) Patent No.: US 9,740,786 B1
(45) Date of Patent: *Aug. 22, 2017

(54) PERSISTENT SEARCHES

(71) Applicant: Amazon Technologies, Inc., Seattle, WA (US)

(72) Inventor: Derek Gaw, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/616,136

(22) Filed: Feb. 6, 2015

Related U.S. Application Data

(63) Continuation of application No. 11/955,615, filed on Dec. 13, 2007, now Pat. No. 8,954,430.

(51) Int. Cl.
*G06F 17/30* (2006.01)

(52) U.S. Cl.
CPC .. *G06F 17/30867* (2013.01); *G06F 17/30345* (2013.01); *G06F 17/30489* (2013.01); *G06F 17/30554* (2013.01); *G06F 17/30899* (2013.01); *G06F 17/30979* (2013.01)

(58) Field of Classification Search
CPC ......... G06F 17/30554; G06F 17/30489; G06F 17/30345; G06F 17/30979; G06F 17/30442; G06F 17/30899
USPC .......................... 707/705–780; 705/1.1–500; 715/200–867
See application file for complete search history.

(56) References Cited

U.S. PATENT DOCUMENTS

| | | |
|---|---|---|
| 6,014,665 A | 1/2000 | Culliss |
| 6,487,553 B1 | 11/2002 | Emens et al. |
| 6,810,395 B1 | 10/2004 | Bharat |
| 6,920,448 B2 | 7/2005 | Kincaid et al. |
| 6,928,622 B2 | 8/2005 | Bosma et al. |
| 6,961,731 B2 | 11/2005 | Holbrook |
| 7,162,443 B2 | 1/2007 | Shah |
| 7,325,201 B2 | 1/2008 | Ferrari et al. |
| 7,349,894 B2 | 3/2008 | Barth et al. |
| 7,437,353 B2 | 10/2008 | Marmaros et al. |
| 7,472,119 B2 | 12/2008 | Dai et al. |
| 7,565,425 B2 | 7/2009 | Van Vleet et al. |
| 7,680,824 B2 | 3/2010 | Plastina et al. |
| 7,747,613 B2 | 6/2010 | Freeman et al. |
| 2005/0080770 A1 | 4/2005 | Lueder et al. |
| 2005/0120003 A1 | 6/2005 | Drury et al. |
| 2005/0234891 A1 | 10/2005 | Walther et al. |
| 2007/0022111 A1 | 1/2007 | Salam et al. |
| 2007/0100797 A1 | 5/2007 | Thun et al. |
| 2008/0077558 A1 | 3/2008 | Lawrence et al. |
| 2009/0119254 A1 | 5/2009 | Cross et al. |

*Primary Examiner* — Michelle Owyang
(74) *Attorney, Agent, or Firm* — Thomas | Horstemeyer, LLP

(57) ABSTRACT

Disclosed are various embodiments for saving search results. In one embodiment, each search result is rendered in association with a corresponding toggle control. A search result becomes selected when the corresponding toggle control is activated and the search result is in an initial state. A search result becomes deselected when the corresponding toggle control is activated and the search result is in a saved state.

20 Claims, 8 Drawing Sheets

PERSISTENT SEARCHES

CROSS-REFERENCE TO RELATED APPLICATIONS

This application is a continuation of, and claims priority to, co-pending U.S. Patent Application entitled "PERSISTENT SEARCHES," filed on Dec. 13, 2007, and assigned application Ser. No. 11/955,615, which is incorporated herein by reference in its entirety.

BACKGROUND

The vast amount of information available on the Internet has led to the appearance of search engines, which allow a user to search for content meeting specified criteria. Users often employ a trial and error approach to find the criteria that gives desired results. Thus, it is not uncommon for a user to perform a series of successive searches in order to find content desired content. However, conventional Internet search technology treats each search separately, so that a user is left with distinct sets of search results.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
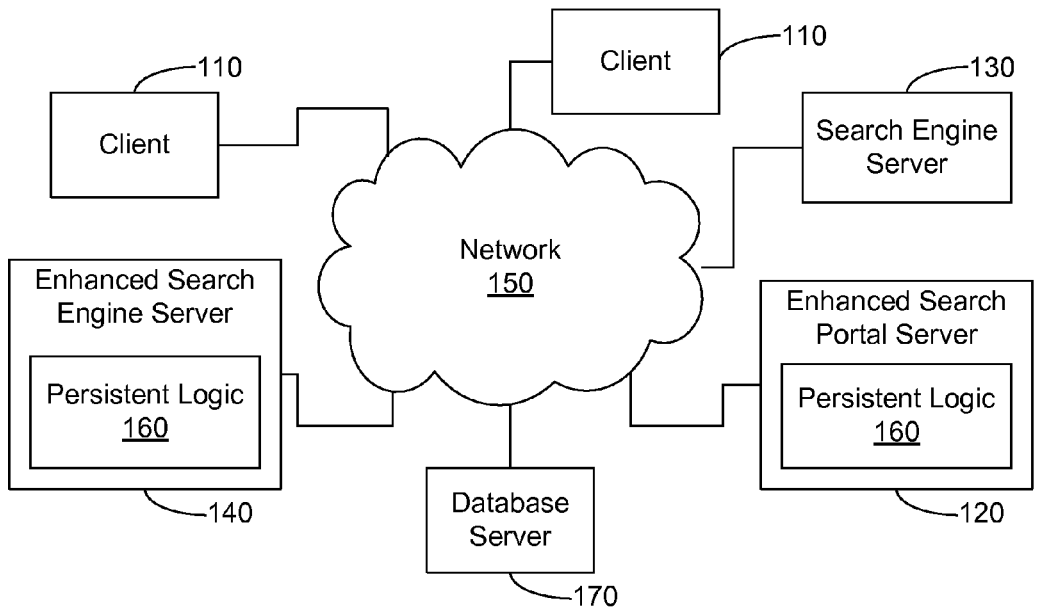
FIG. 1 is a block diagram of an environment in which a system and method for persistent searches is located, according to an embodiment of the present disclosure.

FIG. 1 is a block diagram of an environment in which one embodiment of a system and method for persistent searches is located. As shown in FIG. 1, various clients 110 and servers, such as enhanced search portal server 120 and search engine server 130, and enhanced search engine server 140, communicate with each other via network 150. Network 150 includes, for example, the Internet, intranets, wide area networks (WANs), local area networks, wireless networks, or other suitable networks, etc., or any combination of two or more such networks.

In one embodiment, servers 120, 130, and 140 are implemented by web servers which accept hypertext transfer protocol (HTTP) requests, and in response serve HTTP responses along with optional data contents. These contents may include web pages such as hypertext markup language (HTML) documents and linked objects (e.g., images, sounds, videos, etc.). In one embodiment, client 110 includes a web browser, which sends HTTP requests to a web server, and displays to the user the contents returned by the web server. Client 110 may be implemented by a variety of devices, such as (but not limited to) a general purpose computer, a mobile phone, a personal digital assistant (PDA), a media player, a digital camera, a digital recorder, a multimedia device, and/or a consumer electronics device.

Logic for persistent searches 160 provides clients 110 with enhanced search capabilities by allowing a client 110 to search for items and then save particular items in the search results, which will then be displayed along with results of new searches. In one embodiment, the search is a search for products in a product database, but the principles disclosed herein apply to other types of searches as well. For example, searches and search results could pertain to documents retrieved in any type of document retrieval system, including searches for documents on remote clients 110. In addition, the searches could be for documents on the client system itself. In such embodiments, the clients 110 and search engine servers 120, 130, 140 may be co-located on the same computing system.

In the example environment of FIG. 1, one instance of logic for persistent searches 160 resides enhanced search engine server 140, which performs searches requested by client 110. Another instance of logic 160 resides in an enhanced search portal server 120, which provides search capabilities to client 110, and delegates the search itself to search engine server 130. Search engine server 130, in turn, communicates with a database server 170. In some embodiments, servers 120, 130, and 140 provide functionality in the form of web services, which are application program interfaces (APIs) that can be accessed over network 150 and executed on a remote system that hosts the requested services.

FIGS. 2A-D are diagrams of an example user interface for persistent searches which is presented by client 110. Window 200 includes a search entry field 210, into which a user enters search terms or criteria, and a search button 220, by which the user activates or begins the search. In this example, the terms are text, but other embodiments may allow for other criteria, for example, dates. Search results are then displayed in window 200.

Each item 230 of the search results is displayed with a tag control 240, which allows the user to tag or mark the item to be saved across multiple searches. Items 230 from various sets of search results can be tagged and accumulated in a way which keeps the accumulated items visible on the same page as the most recent search results. In some embodiments, window 200 is implemented as a web page. The functionality of generating and displaying window 200 may be split between by client 110 and logic for persistent searches 160, using various technologies, including (but not limited to) hypertext markup language (HTML), dynamic HTML, server-side scripting, ActiveX controls, Java applets, Active Server pages, etc.

Figure 2A:
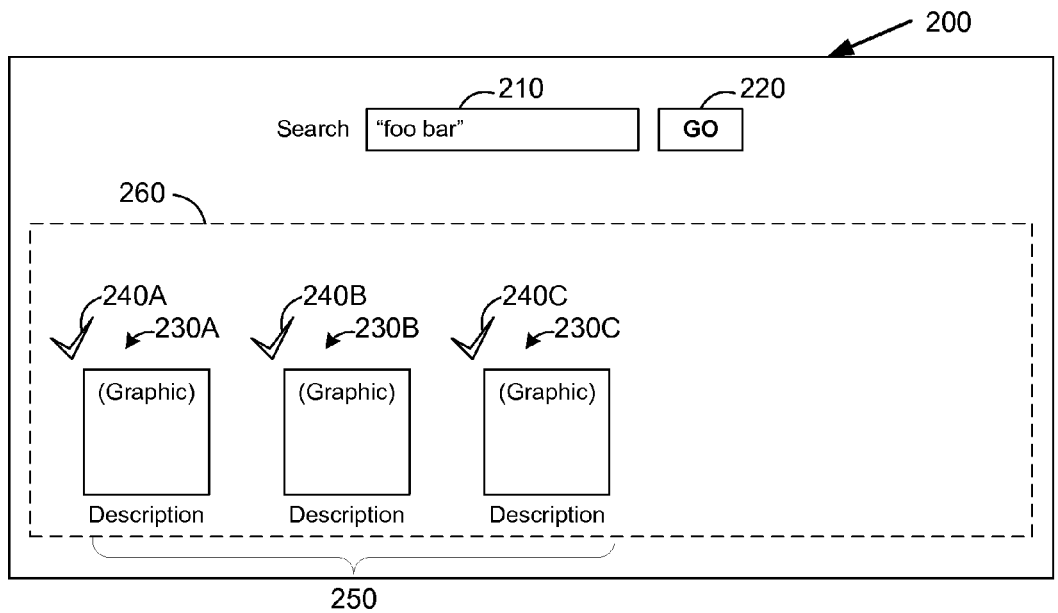
FIGS. 2A-D are diagrams of an example user interface for persistent searches which is presented by the client in FIG. 1, according to an embodiment of the present disclosure.
Figure 2B:
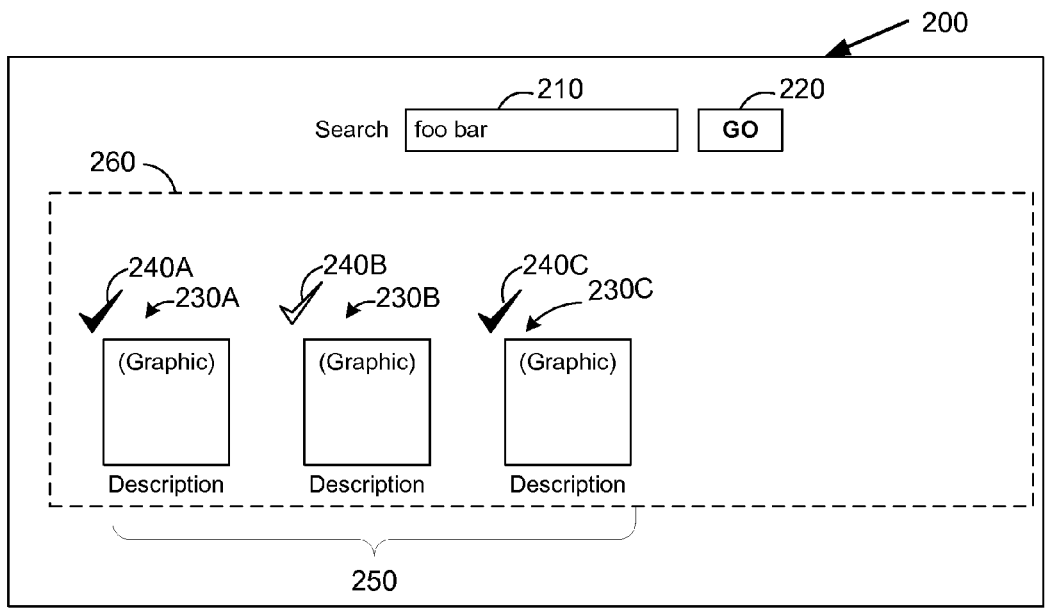

The behavior of saving results across searches will be described in connection with FIGS. 2A-D, which illustrate a sequence of user actions. FIG. 2A illustrates window 200 at the start of the sequence after an initial search has been performed using the search term "foo bar". Search results 250 for this term include three items, 230A-C, which are displayed in a search results area 260. In this example, the initial state of tag control 240 for each item 230 is off, meaning that the items 230A-C returned by the initial search are not saved across searches. In this example, tag control 240 takes the form of a check button, which toggles between unfilled (unselected or untagged) and filled (selected or tagged). Thus, in FIG. 2A all three items, 230A-C, are initially associated with an unfilled check button 240. The next step in the sequence is shown in FIG. 2B, where two of the items in search results 250, namely 230A and 230E, are selected to be saved across searches. When selected, the corresponding tag controls, 240A and 240C, are shown as filled.

Figure 2C:
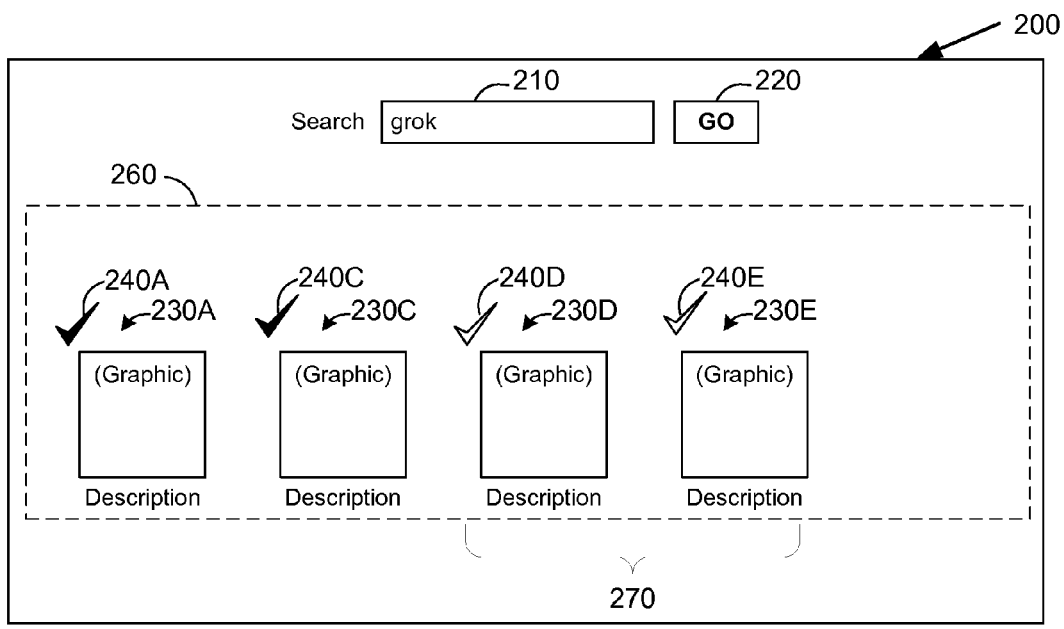

The tagging operation can be further understood in connection with FIGS. 2A-D, where additional search operations are performed. FIG. 2C illustrates window 200 after a second search is performed using the search term "grok". The search results 270 for this second search comprise items 230D and 230E. Since items 230A and 230C were previously tagged (FIG. 2B) for saving across searches, the new search results 270 are displayed in conjunction with the tagged or saved items from the previous search. Thus, search results area 260 in FIG. 2C contains items 230A, 230C, 230D, and 230E—but not item 230B, since that item was not tagged in FIG. 2B.

In this example scenario, the user decides not to save or tag any of the second set of search results 270, so corresponding tag controls 240D and 240E remain in the default unfilled state. However, it should be understood that any of the results 270 could be tagged in order to return those results along with subsequent search results. Further, results 230A and/or 230C could be deselected at this time in the event that either of these results are not desired to be saved to be returned with subsequent search results. For example, this functionality may helpful when it is determined that one or more of results 270 is more relevant than any of the previously tagged search results.

Figure 2D:
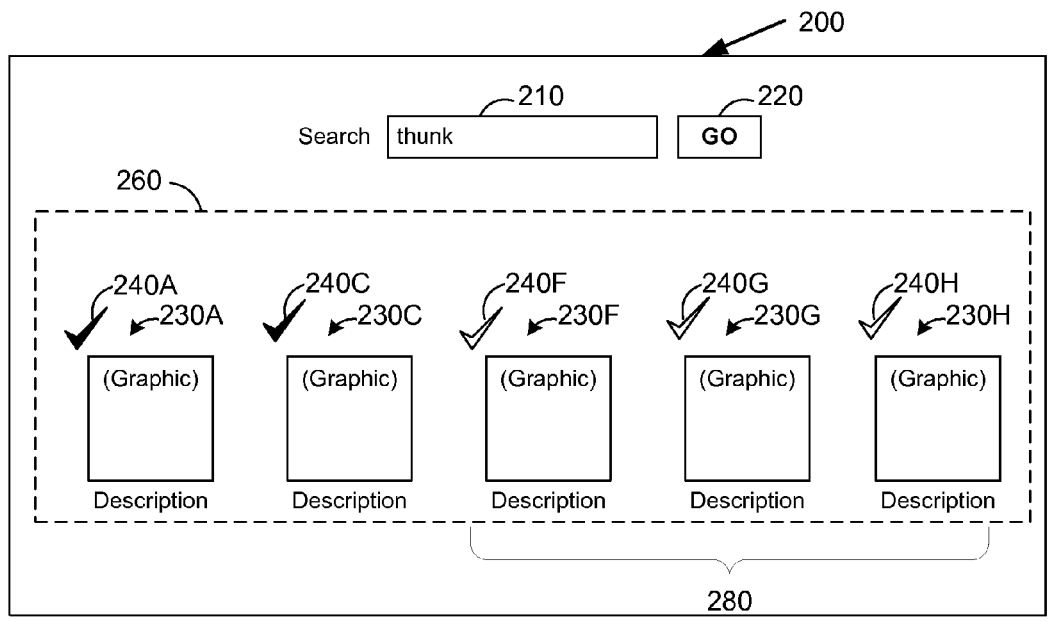

FIG. 2D illustrates the results of a third search using the search term "thunk". The results 280 of this third search comprise items 230F-H. Search results area 260 contains tagged items (230A and 230C) from the first "foo bar" search, no items from the second "grok" search, and all items (230F-H) returned from the third "thunk" search. Among many potential benefits, displaying tagged items from previous searches on the same page as items from the current search can provide, for example, a more streamlined user experience since the user does not have to switch between one page that displays current search results and another page (e.g., a page showing previous search results, a "wish list", and/or "shopping cart" page) that displays selected items of interest. A user can easily compare old results to new results without having to remember or switch between open user interfaces. The ability to view items within the same user interface can, in some environments, reduce the amount of memory required in a client system that is needed to display the multiple user interfaces. Additionally, the feature can be advantageous when returning search results to client devices with limited display space, such as on many mobile devices, kiosks, etc.

Additional search actions work in a similar manner. For example, if a user tags an item 230 from the third set of search results 280, then after next search action, results 280 would include tagged items from the first "foo bar" search, no items from the second "grok" search, and tagged items from the third "thunk" search. Although not shown here, a user can untag or deselect an item at any time. For example, if a user untags all items in the first ("foo bar") set of item 230, and tags items from the third ("thunk") set of search results, then after the next search action, results 280 would include no items from the first "foo bar" search, no items from the second "grok" search, and tagged items from the third "thunk" search.

In FIGS. 2A-D, according to one embodiment, the user performed an explicit keyword-based search. In other embodiments, searches may be performed in a browse context. This may, in some cases, be known as attribute-based searching, in which items are searched on by narrowing search results by various attributes, which could be product categories, product specifications, or product attributes, among many other possibilities. The attribute-based searching or filtering can be further narrowed by using a keyword based search (e.g., items defined by selected attributes can be further searched by keyword).

In this browse context, a user browses through a hierarchy of categories and subcategories and/or attributes, each of which may contain or be associated with various items. As the user moves from one category/subcategory to the next, items can be marked for accumulation. FIGS. 3A-E are diagrams of a user interface, including a window 300, for saving items across browse actions, according to various embodiments. The functionality of generating and displaying window 300 may be split between by client 110 and logic for persistent searches 160, using various technologies, including (but not limited to) HTML, dynamic HTML, server-side scripting, ActiveX controls, Java applets, Active Server pages, etc.

Figure 3A:
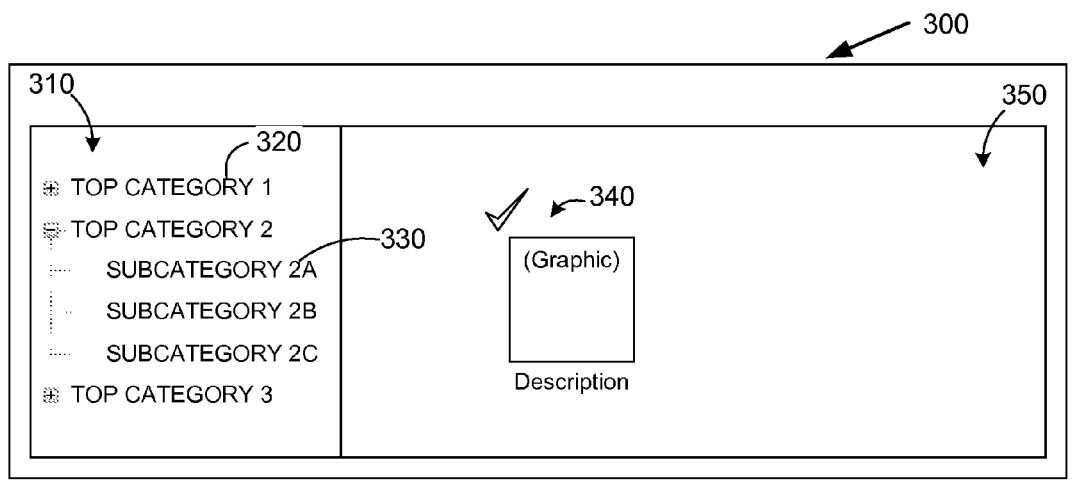
FIGS. 3A-E are diagrams of an example user interface for persistent searches which is presented by the client in FIG. 1, according to an embodiment of the present disclosure.

As can be seen in FIG. 3A, window 300 includes a tree view control 310, which allows the user to navigate between a hierarchy of categories 320 and subcategories 330. Items 340 contained within these categories and/or subcategories are displayed in an item display area 350. As the user navigates, the items in item display area 350 change to display items in the currently selected category/subcategory. Highlighting may be used, for example, to indicate the current selection, but other visual indicators may be used. In these examples, tree view control 310 is displayed in a left-hand pane, and item display area 350 forms the right-hand pane. Although not shown, window 300, as well as any panes within window 300, may be individually scrollable. With the scrolling feature, the visible area of the pane or window acts as a view into a larger virtual canvas comprising the entire pane or window.

Figure 3B:
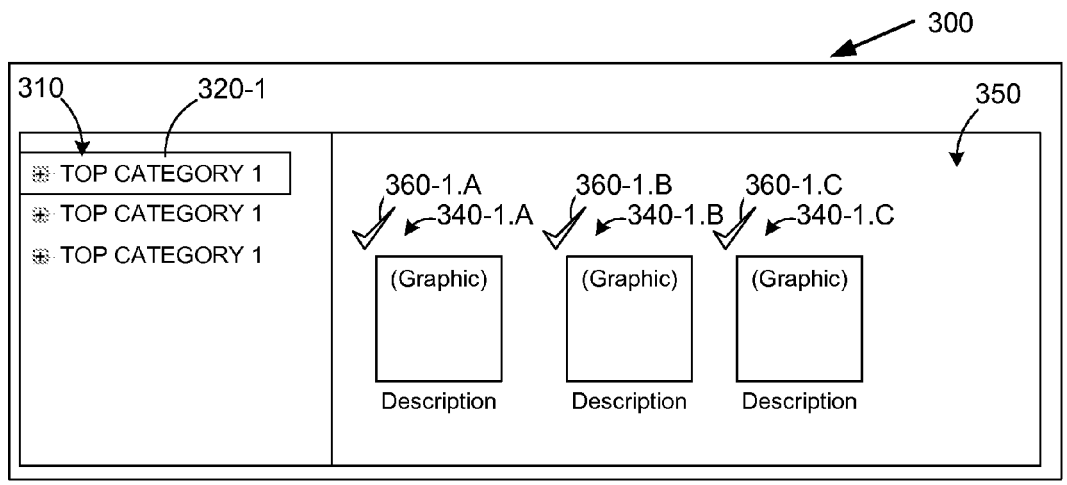

The behavior of saving results across browse actions will be described in connection with FIGS. 3B-E, which illustrate a sequence of user interactions with the disclosed systems and/or methods. FIG. 3B illustrates window 300 at the start of the sequence after a user has selected top-level category 320-1. Since the user has navigated to (selected) top-level category 320-1, item display area 350 includes items in that category, namely, items 340-1.A, 340-1.B and 340-1.C. Each item 340 is associated with, and displayed in proximity to, a tag control 360. In this example, the initial state of the tag control 360 for each item 340 is off, meaning that the items 340A, B, and C are not saved across browse or navigation actions. In this example scenario, the user has decided not to save or tag any of the items in top-level category 320-1.

Figure 3C:
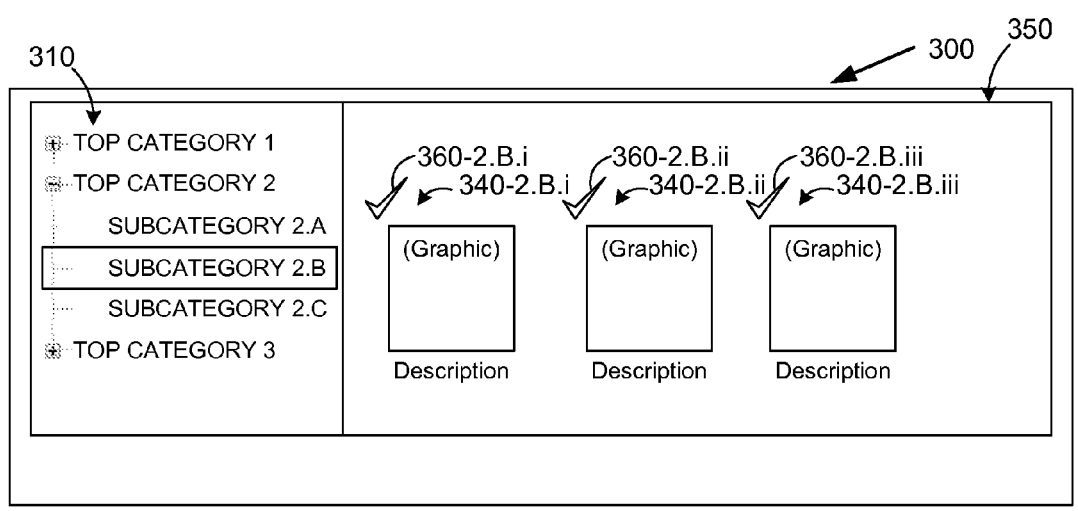
Figure 3D:
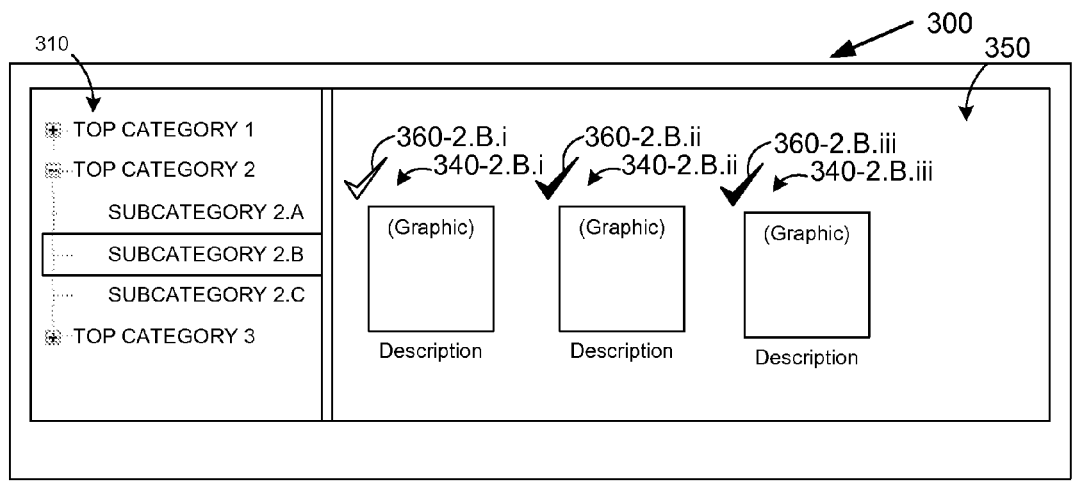

The tagging operation will be further described in connection with FIGS. 3C-E, where additional navigation operations are performed. FIG. 3C illustrates window 200 after the user has expanded top-level category 320-2, using tree view control 310. When expanded, the subcategories underneath top-level category 320-2 are visible, namely, subcategories 330-2.A, B, and C. In this example scenario, the currently selected category/subcategory is subcategory 330-2.B, so item display area 350 includes items in that subcategory, namely, items 340-2.B.i, 340-2.B.ii and 340-2.B.iii. As before, the initial state of the tag control 360 for each item 340 is off. The sequence continues with FIG. 3D, where two of the items, 340-2.B.ii and 340-2.B.iii, are selected to be saved across browse actions. Thus, the corresponding tag controls, 360-2.B.ii and 360-2.B.iii, are shown as filled in.

Figure 3E:
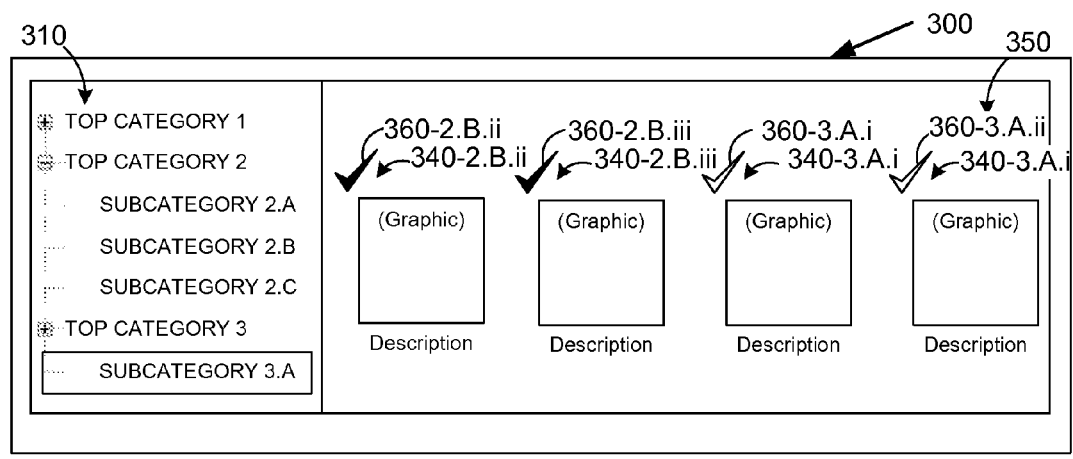

FIG. 3E illustrates the results of another browse action, in which subcategory 330-3.A.i is selected. Item display area 350 includes items in that subcategory, namely, items 340-3.A.i and 340-3.A.ii. Since items 340-1.B.ii and 340-1.B.iii were previously tagged (FIG. 3D) for saving across browse actions, the items in the currently selected subcategory are displayed within item display area 350 in conjunction with the tagged or saved items from the previous search. Thus, item display area 350 in FIG. 3E contains newly-browsed-to items (340-3.A.i and 340-3.A.ii), and previously saved items (340-1.B.ii and 340-1.B.iii, but not 340-1.B.ii, since that item was not tagged in FIG. 3C).

Although these examples use a check button for tag controls 240 and for tag controls 360 for ease of illustration, other controls may also be used. As one example, a pushpin button could be used, with the pushpin toggling between two different colors. As another example, a check box control could be used, with the box toggling between checked and unchecked. As yet another example, a text button could be used, with the text label toggling between "Select" and "Unselect", or "Tag" and "Untag".

Figure 4:
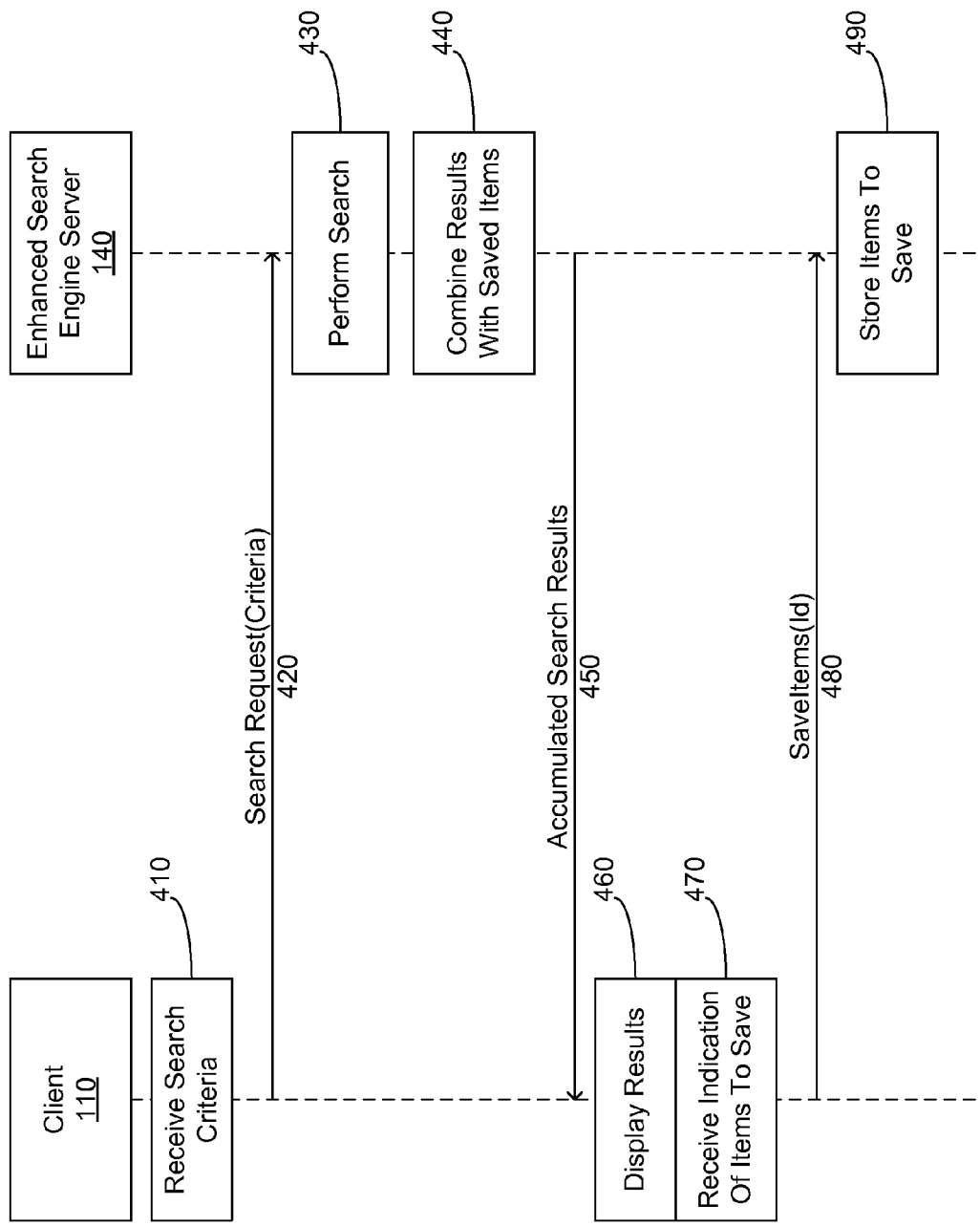
FIG. 4 is a messaging diagram illustrating interactions between the client and the enhanced search engine in FIG. 1, according to an embodiment of the present disclosure.

FIG. 4 is a messaging diagram illustrating interactions between client 110 and enhanced search engine server 140 from FIG. 1, according to an embodiment of the present disclosure in which logic for persistent searches 160 resides within enhanced search engine server 140.

Client 110 receives 410 search criteria from a user, and requests (420) a search from enhanced search engine server 140, providing the search criteria. Enhanced search engine server 140 performs (430) the search, using the criteria, then combines (440) the most recent search results with any saved search items. (The process of saving items will be discussed below in connection with messages 480 and 490.) Enhanced search engine server 140 provides the accumulated search results (450) back to client 110, which displays (460) the accumulated search results.

Client 110 then receives, from the user, an indication (470) of tagged or selected items within the search results, to be saved for display with later search results. In some embodiments, the tagged or selected items are saved as part of session instance data, so that the tagging/selection information is saved across sessions as well as saved across successive searches which are not part of a session. Client 110 requests (480) enhanced search engine server 140 to save these items, providing identifiers of the tagged or selected items. In some embodiments, client 110 provides server 140 with parameters in a uniform resource locator (URL), and scripts running on server 140 use these parameters to identify the search items to be saved. Enhanced search engine server 140 stores (490) the tagged items, for use later when the tagged items are combined with items in a new set of search results (described earlier in connection with block 440). In some embodiments the tagged items are stored in session instance data at enhanced search engine server 140. In other embodiments, the tagged items are stored in a database. In still other embodiments, logic for persistent searches 160 resides at client 110, and the tagged items are stored at the client (e.g., in a browser cookie, or in session instance data).

Figure 5:
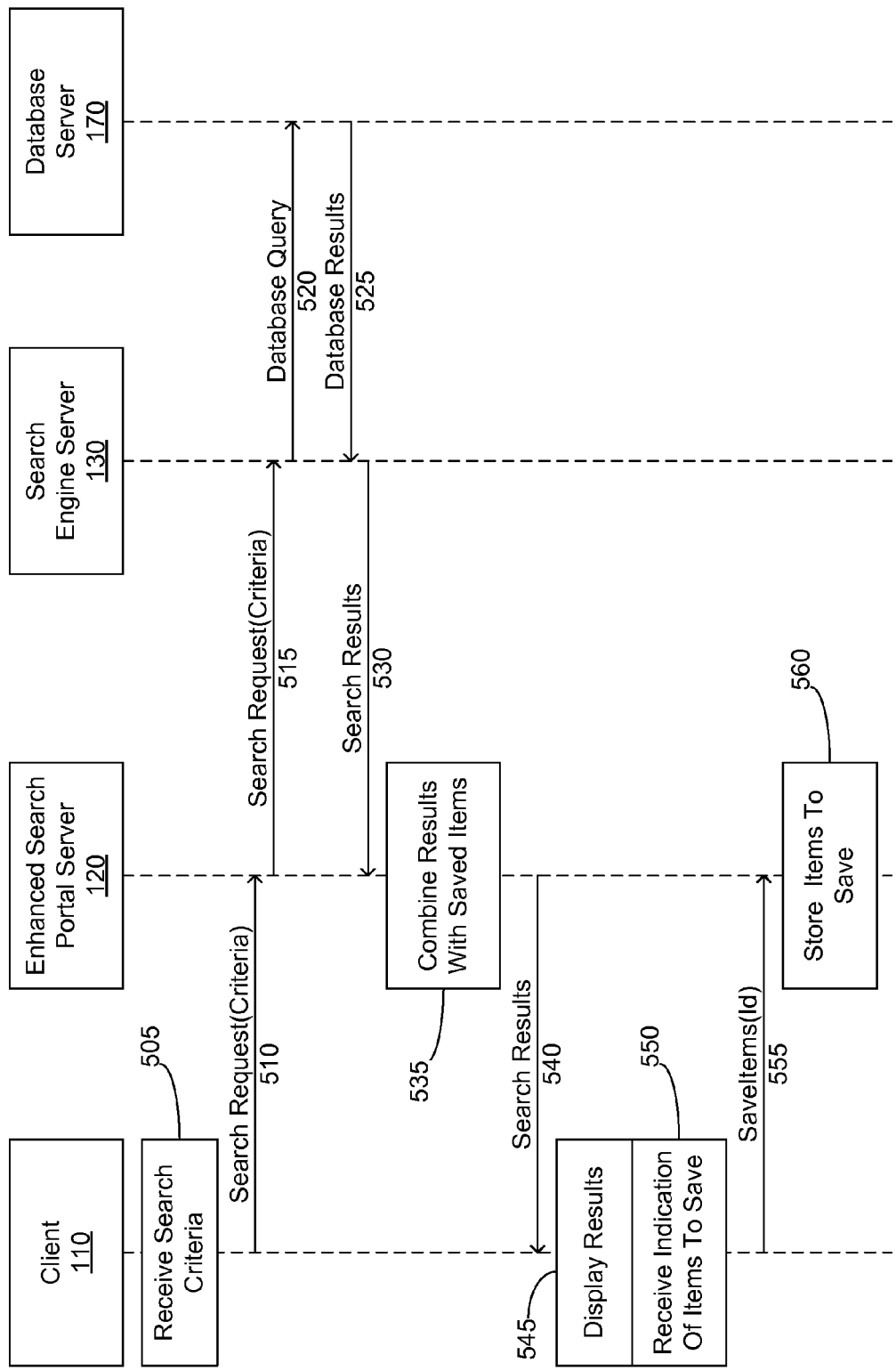
FIG. 5 is a messaging diagram illustrating interactions between several components in FIG. 1, according to an embodiment of the present disclosure.

FIG. 5 is a messaging diagram illustrating interactions between several components from FIG. 1, according to an embodiment in which logic for persistent searches 160 resides within enhanced search portal server 120. In some embodiments, enhanced search portal server 120 or search engine server 130 provide functionality in the form of a set of web services.

Client 110 receives (505) search criteria from a user, and requests (510) a search from enhanced search portal server 120, providing the search criteria. Enhanced search portal server 120 in turn requests (515) a search from enhanced search engine server 140. The criteria 515 in this request may identical to the criteria 510 that are provided by the user, or may be translated or mapped by enhanced search portal server 120.

Enhanced search engine server 140 performs the search using the criteria 515, by querying (520) database server 170. Database server 170 provides (525) the results of the query back to enhanced search engine server 140, which in turn forwards (530) the results back to enhanced search portal server 120. Enhanced search portal server 120 combines (535) the most recent search results with any saved search items. (The process of saving items will be discussed below in connection with messages 555 and 560.) Enhanced search engine server 140 provides the accumulated search results (540) back to client 110, which displays (545) the accumulated search results.

Client 110 then receives, from the user, an indication (550) of tagged or selected items within the search results, to be saved for display with later search results. In some embodiments, the tagged or selected items are saved as part of session instance data, so that the tagging/selection information is saved across sessions as well as saved across successive searches which are not part of a session. In this example, client 110 requests (555) enhanced search portal server 120 to save these items, providing identifiers of the tagged or selected items. Enhanced search portal server 120 stores (560) the identifiers of tagged items to be used later when the tagged items are combined with items in a new set of search results (described earlier in connection with block 535). In some embodiments, client 110 provides server 120 with parameters in a uniform resource locator (URL), and scripts running on server 120 use these parameters to identify the search items to be saved. In some embodiments the tagged items are stored in session instance data at enhanced search portal server 120. In other embodiments, the tagged items are stored in a database. In still other embodiments, logic for persistent searches 160 resides at client 110, and the tagged items are stored at the client (e.g., in a browser cookie, or in session instance data).

Figure 6:
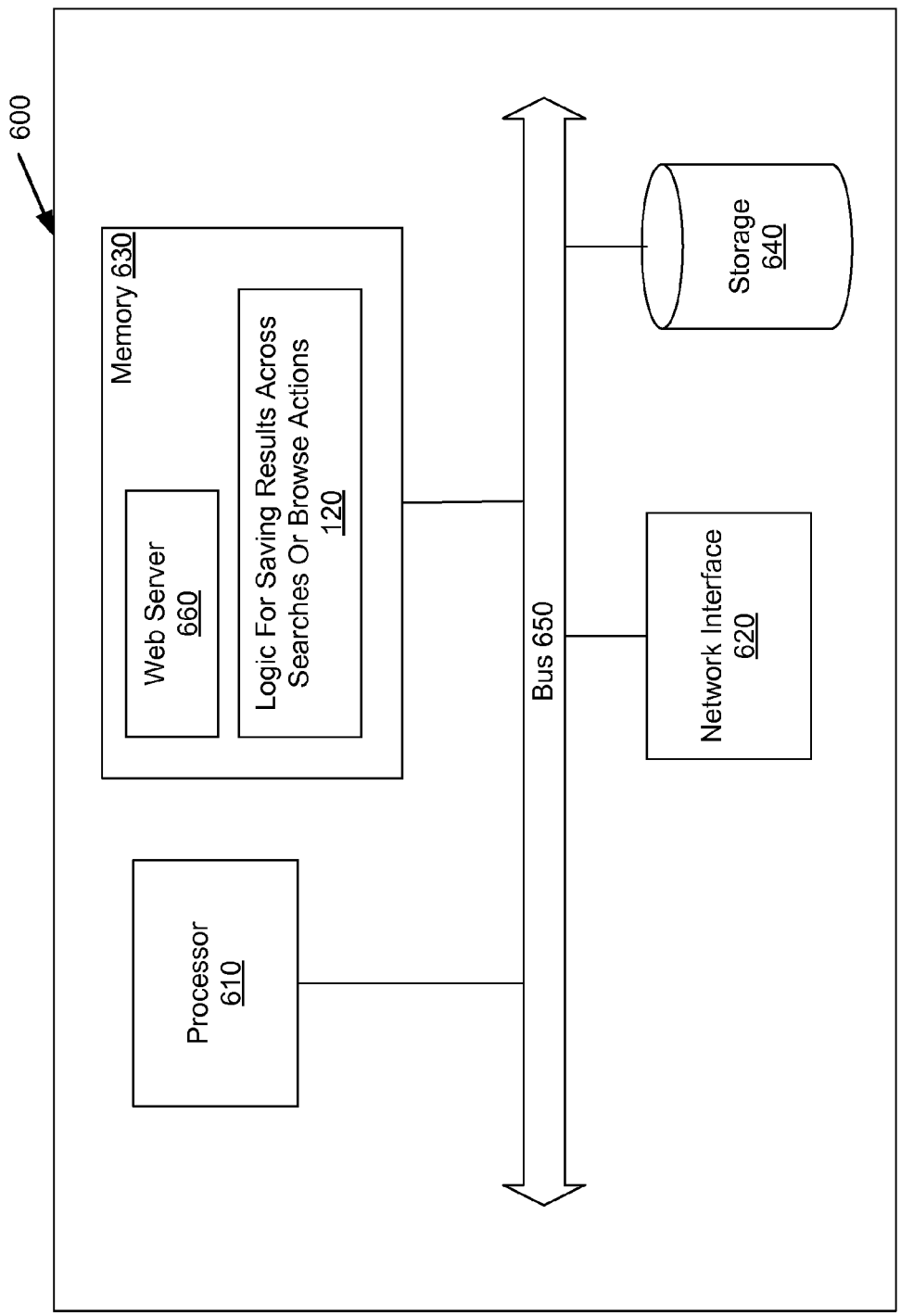
FIG. 6 is a schematic block diagram of a general-purpose computer which can be used to implement systems or method as described in connection with FIGS. 1-5, according to an embodiment of the present disclosure.

FIG. 6 is a schematic block diagram of a general-purpose computer system 600 which can be used to implement various embodiments of systems and methods for persistent searches, for example, enhanced search portal server 120 and enhanced search engine server 140. Computer system 600 contains a number of components that are well known in the computer arts, including a processor 610, a network interface 620, memory 630, and storage device 640. These components are coupled via a bus 650.

Stored on memory 630 and executable by processor 610 are various components such as web server 660 and logic for persistent searches 160. Memory 630 is defined herein as both volatile and nonvolatile memory. Volatile components are those that do not retain data values upon loss of power. Nonvolatile components are those that retain data upon a loss of power. Thus, memory 630 may comprise, for example, random access memory (RAM), read-only memory (ROM), and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Examples of storage device 640 include, for example, a hard disk, flash random access memory (RAM), flash read-only memory (ROM), and electrically-erasable programmable read-only memory (EEPROM). Omitted from FIG. 6 are a number of conventional components that are unnecessary to explain the operation of computer system 600.

The systems and methods disclosed herein can be implemented in software, hardware, or a combination thereof. In some embodiments, the device, system, and/or method is implemented in software that is stored in a memory and that is executed by a suitable microprocessor, network processor, or microcontroller situated in a computing device. In other embodiments, the device, system and/or method is implemented in hardware, including, but not limited to, a programmable logic device (PLD), programmable gate array (PGA), field programmable gate array (FPGA), an application-specific integrated circuit (ASIC), a system on chip (SoC), or a system in package (SiP).

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The flow charts, messaging diagrams, state diagrams, and/or data flow diagrams herein provide examples of the operation of logic for persistent searches 160 according to an embodiment of the present disclosure. Alternatively, these diagrams may be viewed as depicting actions of an example of a method implemented in logic for persistent searches 160. Blocks in these diagrams represent procedures, functions, modules, or portions of code which include one or more executable instructions for implementing logical functions or steps in the process. Alternate implementations are also included within the scope of the disclosure. In these alternate implementations, functions may be executed out of order from that shown or discussed, including substantially concurrently or in reverse order, depending on the functionality involved.

The software components illustrated herein are abstractions chosen to illustrate how functionality is partitioned among components in some embodiments of a system and method persistent searches. Other divisions of functionality are also possible, and these other possibilities are intended to be within the scope of this disclosure. Furthermore, to the extent that software components are described in terms of specific data structures (e.g., arrays, lists, flags, pointers, collections, etc.), other data structures providing similar functionality can be used instead. As just one example, a particular implementation might use a linked list instead of an array.

Software components are described herein in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform.

Software components referred to herein include executable code that is packaged, for example, as a standalone executable file, a library, a shared library, a loadable module, a driver, or an assembly, as well as interpreted code that is packaged, for example, as a class. In general, the components used by systems and methods for persistent searches are described herein in terms of code and data, rather than with reference to a particular hardware device executing that code. Furthermore, the systems and methods can be implemented in any programming language, and executed on any hardware platform.

The foregoing description has been presented for purposes of illustration and description. It is not intended to be exhaustive or to limit the discussion to the precise forms disclosed. Obvious modifications or variations are possible in light of the above teachings. The implementations discussed, however, were chosen and described to illustrate the principles of the various embodiments and its practical application to thereby enable one of ordinary skill in the art to utilize the respective embodiments in various implementations and with various modifications as are suited to the particular use contemplated. All such modifications and variation are within the scope of the disclosure as determined by the appended claims when interpreted in accordance with the breadth to which they are fairly and legally entitled.

At least the following is claimed:

1. A non-transitory computer-readable medium embodying a program executable in at least one computing device, wherein when executed the program causes the at least one computing device to at least:

generate a plurality of current search results corresponding to a current search query from a client;

generate a user interface comprising a search results area that presents a plurality of search results comprising the plurality of current search results corresponding to the current search query being included without regard to a plurality of previous search results corresponding to a previous search query, and at least one saved search result that has been user-selected to a saved state that causes the at least one saved search result to be included without regard to the current search query, the plurality of search results being rendered in association with a corresponding plurality of tagging controls comprising a first tagging control that sends an indication of a selection of a corresponding one of the plurality of current search results to the saved state, and a second tagging control that sends an indication of a deselection of a corresponding one of the at least one saved search result from the saved state; and render the user interface on a display of the client.

2. The non-transitory computer-readable medium of claim 1, wherein the at least one saved search result is caused to be in the saved state in response to receiving an indication of the at least one saved search result from the plurality of previous search results corresponding to the previous search query received from the client.

3. The non-transitory computer-readable medium of claim 1, wherein when executed the program further causes the at least one computing device to at least, in response to receiving the indication of the deselection of the corresponding one of the at least one saved search result, exclude the corresponding one of the at least one saved search result from the plurality of search results.

4. The non-transitory computer-readable medium of claim 1, wherein when executed the program further causes the at least one computing device to at least store saved search result data in a browser cookie.

5. The non-transitory computer-readable medium of claim 1, wherein when executed the program further causes the at least one computing device to at least, in response to receiving the indication of the deselection of the corresponding one of the at least one saved search result, update the corresponding one of the at least one saved search result to be removed from the saved state.

6. The non-transitory computer-readable medium of claim 1, wherein when executed the program further causes the at least one computing device to at least, in response to receiving the indication of the selection of the corresponding one of the plurality of current search results, update the corresponding one of the plurality of current search results to be in the saved state.

7. A system, comprising:
at least one computing device comprising at least one hardware processor and at least one hardware memory; and
a search engine service stored in the at least one hardware memory and executed in the at least one computing device, the search engine service causing the at least one computing device to at least:
generate a user interface comprising a plurality of search results including a plurality of current search results corresponding to a current search criterion, the plurality of current search results being included without regard to a plurality of previous search results corresponding to a previous search criterion, and at least one saved search result, the at least one saved search result having been user-selected to a saved state that causes the at least one saved search result to be included irrespective of the current search criterion, the plurality of search results being rendered in association with a corresponding plurality of toggle controls comprising a first toggle control that facilitates a user indication of a selection of a corresponding one of the plurality of current search results to the saved state, and a second toggle control that facilitates a user indication of a deselection of a corresponding one of the at least one saved search result from the saved state; and send data encoding the user interface to a client, wherein in response to receiving the data encoding the user interface, the client renders the user interface on a display.

8. The system of claim 7, wherein the search engine service further causes the at least one computing device to at least cause the at least one saved search result in the user interface to be in the saved state in response to receiving a user indication of the at least one saved search result from the plurality of previous search results corresponding to the previous search criterion.

9. The system of claim 7, wherein the search engine service further causes the at least one computing device to at least, in response to receiving the user indication of the deselection of the corresponding one of the at least one saved search result, exclude the corresponding one of the plurality of search results from the user interface.

10. The system of claim 7, wherein individual ones of the corresponding plurality of toggle controls are rendered as a first icon when the corresponding one of the plurality of search results is not in the saved state and as a second icon when the corresponding one of the plurality of search results is in the saved state.

11. The system of claim 7, wherein the search engine service further causes the at least one computing device to at least generate a tree view control in the user interface, the tree view control facilitating navigation within a hierarchy of item categories, the tree view control including an item display area for displaying at least one item associated with a selected one of the hierarchy of item categories.

12. The system of claim 11, wherein the search engine service further causes the at least one computing device to at least render a saved search result for display within the item display area, the saved search result being associated with a non-selected one of the hierarchy of item categories.

13. A method, comprising:
receiving, by at least one computing device, a plurality of current search results corresponding to a current query;
encoding, by the at least one computing device, a user interface comprising:
a plurality of search results comprising the plurality of current search results corresponding to the current query, the plurality of current search results being included without regard to a plurality of previous search results corresponding to a previous query, and at least one saved search result that has been user-selected to a saved state that causes the at least one saved search result to be included in the plurality of search results without regard to the current query; and
a corresponding plurality of toggle controls in association with the plurality of search results, the corresponding plurality of toggle controls comprising a first toggle control that facilitates a user indication of a selection of a corresponding one of the plurality of current search results to the saved state, and a second toggle control that facilitates a user indication of a deselection of a corresponding one of the at least one saved search result from the saved state; and
rendering, by the at least one computing device, the user interface on a display.

14. The method of claim 13, wherein the at least one saved search result is caused to be in the saved state in response to receiving a user indication of a selection of the at least one saved search result from the plurality of previous search results.

15. The method of claim 13, further comprising:
receiving, by the at least one computing device, the user indication of the selection of the corresponding one of the plurality of current search results; and
updating, by the at least one computing device, the corresponding one of the plurality of current search results to be in the saved state.

16. The method of claim 13, further comprising:
receiving, by the at least one computing device, the user indication of the deselection of the corresponding one of the at least one saved search result; and
updating, by the at least one computing device, the corresponding one of the at least one saved search result to be removed from the saved state.

17. The method of claim 13, wherein individual ones of the plurality of toggle controls are encoded to appear in an unfilled state when the corresponding one of the plurality of search results is not in the saved state and encoded to appear in a filled state when the corresponding one of the plurality of search results is in the saved state.

18. The method of claim 13, wherein the user interface further comprises a tree view control that facilitates navigation within a hierarchy of item categories, the tree view control including an item display area for displaying at least one item associated with a selected one of the hierarchy of item categories.

19. The method of claim 18, further comprising causing, by the at least one computing device, a saved search result to be displayed within the item display area, the saved search result being associated with a non-selected one of the hierarchy of item categories.

20. The method of claim 13, further comprising:
removing the plurality of current search results from the plurality of search results;
including, in the plurality of search results, a plurality of new search results corresponding to another query; and
including, in the plurality of search results, at least one saved search result that is included without regard to the other query.

\* \* \* \* \*